United States Patent [19]

Marsi et al.

[11] Patent Number: 5,556,110
[45] Date of Patent: Sep. 17, 1996

[54] SHROUD ENCLOSURE FOR BRITTLE MECHANICAL FACE MATERIALS

[75] Inventors: Joseph A. Marsi, Palos Verdes; Milton E. Cook, Huntington, both of Calif.

[73] Assignee: BW/IP International, Inc., Long Beach, Calif.

[21] Appl. No.: 272,998

[22] Filed: Jul. 14, 1994

Related U.S. Application Data

[63] Continuation of Ser. No. 939,300, Sep. 2, 1992, abandoned.

[51] Int. Cl.⁶ ........................... F16J 15/34
[52] U.S. Cl. ........................... 277/38; 277/81 R
[58] Field of Search ........................... 277/26, 38–43, 277/81 R, 84, 85, 87

[56] References Cited

U.S. PATENT DOCUMENTS

| | | |
|---|---|---|
| 2,177,005 | 10/1939 | Purtell . |
| 3,101,200 | 8/1963 | Tracy ........................... 277/81 R |
| 3,124,188 | 3/1964 | Muenchinger . |
| 3,176,746 | 4/1965 | Walton . |
| 3,339,389 | 9/1967 | Mosow . |
| 3,770,181 | 11/1973 | Stahl ........................... 277/81 X |
| 3,841,642 | 10/1974 | Kirker, Jr. ........................... 277/40 |
| 3,882,917 | 5/1975 | Orlomoski . |
| 3,885,613 | 5/1975 | Evans . |
| 3,972,359 | 8/1976 | Thomas . |
| 3,972,360 | 8/1976 | Cadwallader . |
| 3,972,361 | 8/1976 | Ollis, Jr. . |
| 3,982,575 | 9/1976 | Ollis, Jr. et al. . |
| 4,260,005 | 4/1981 | Stencel . |
| 4,273,175 | 6/1981 | Capuano . |
| 4,519,615 | 5/1985 | Bjorklund . |
| 4,586,719 | 5/1986 | Marsi et al. . |
| 4,613,142 | 9/1986 | Heilala ........................... 277/38 X |
| 4,659,092 | 4/1987 | Wallace et al. ........................... 277/84 X |
| 4,691,927 | 9/1987 | Sudol et al. ........................... 277/26 |
| 4,700,153 | 10/1987 | Kuusela et al. . |
| 4,700,953 | 10/1987 | Kuusela et al. ........................... 277/38 |
| 4,773,655 | 9/1988 | Lummila et al. ........................... 277/38 X |
| 4,842,286 | 6/1989 | Heilala ........................... 277/38 |
| 5,039,113 | 8/1991 | Gardner ........................... 277/81 R |
| 5,042,824 | 8/1991 | Gardner et al. ........................... 277/81 R |
| 5,076,589 | 12/1991 | Marsi . |

FOREIGN PATENT DOCUMENTS

| | | | |
|---|---|---|---|
| 138317 | 7/1984 | European Pat. Off. . | |
| 80559 | 7/1981 | Japan | ........................... 277/84 |
| 1065640 | 1/1984 | U.S.S.R. | ........................... 277/26 |
| 2217398 | 10/1989 | United Kingdom | ........................... 277/81 R |

*Primary Examiner*—Scott W. Cummings
*Attorney, Agent, or Firm*—Pretty, Schroeder, Brueggemann & Clark

[57] ABSTRACT

A mechanical seal assembly having a rotatable seal ring connected to the shaft and a non-rotatable seal ring connected to the housing. A cylindrical drive ring encircles the rotatable seal ring and an annular shroud is mounted to the cylindrical drive ring and extends from it terminating in an annular lip that is disposed in contacting relationship with the rotatable seal ring adjacent the seal face of the rotatable seal ring. The shroud may be provided with a plurality of circumferentially spaced slots. A connection is provided for moving the end of the shroud toward the non-rotatable seal ring when the shaft moves toward the non-rotatable seal ring.

16 Claims, 2 Drawing Sheets

SHROUD ENCLOSURE FOR BRITTLE MECHANICAL FACE MATERIALS

This application is a continuation of application Ser. No. 07/939,300, filed Sep. 2, 1992, now abandoned.

BACKGROUND OF THE INVENTION

This invention relates generally to high pressure mechanical seal assemblies constructed and used with pumps to prevent uncontrolled leakage of high pressure fluid along a rotating shaft and, more particularly, to mechanical seal assemblies using hard, but relatively brittle, seal face materials that may chip or shatter during a malfunction of the pump or other error.

High pressure mechanical seal assemblies are used with nuclear reactor coolant pumps, boiler recirculating pumps, boiler feed pumps and pipeline pumps to meet the requirements for extreme and widely changing conditions of pressures and temperatures encountered in these uses. Examples of such seal assemblies are disclosed in U.S. Pat. No. 4,586,719 to Marsi et al. which issued May 6, 1986 and U.S. Pat. No. 5,076,589 to Marsi which issued Dec. 31, 1991.

A mechanical seal assembly usually includes the combination of a rotatable seal ring connected to a rotatable shaft for rotation with the shaft and a non-rotatable or stationary seal ring connected to a flange of a housing. Each seal ring has a radially disposed seal face and the seal faces oppose each other. There is usually a film of fluid between them, providing lubrication for the rotation of one of the faces. In many seal assemblies, one or more coil springs urge one of the rings toward the other, so that in reality, one or both of the seal rings are capable of limited axial movement, even though they are commonly referred to as "stationary" or "rotatable." Multiple stage seal assemblies comprising a plurality of seal assemblies are known in the art.

The stationary and rotatable seal rings are typically made of different materials. In some applications, the stationary seal face is carbon graphite and the rotating seal face is a harder material such as tungsten carbide, silicon carbide or the like. Silicon carbide is sometimes preferred over tungsten carbide because it is a harder material having a longer life span. It also causes less wear to the carbon graphite stationary seal face and does not corrode as much as tungsten carbide.

One drawback to the use of silicon carbide is that it has a relatively low impact strength, causing it sometimes to chip or shatter if a sudden load is applied to it. Thus, in the case of mechanical seal assemblies used for nuclear service, special care must be given to properly enclose a seal ring made of silicon carbide. This is because a shattered seal ring could have serious consequences if the broken pieces were permitted to escape from the seal assembly into the reactor system possibly causing damage, plugging or jamming of components.

A previous method used to secure the rotatable seal ring to the shaft was by shrink fitting a cylindrical member to the outside of the seal ring. The shrink fit member also enclosed the seal ring, preventing the escape of any chipped pieces of the ring. Shrink fits, however, transmitted radial contact forces to the seal rings, which could adversely affect the sealing properties of the assembly. Careful engineering was thus required to compensate for the shrink-fit forces and thus limit distortion of the seal face.

More recently, less expensive methods of securing the rotating seal ring to the shaft without using shrink fits have been developed. However, these new methods do not fully enclose the rotatable seal ring and therefore have not been used with silicon carbide rings. Accordingly, there still is a need for enshrouding a mechanical seal assembly having a harder, but possibly brittle, seal ring in such a way as to not influence the seal ring pressure and thermal deflection, but which also safely contains the pieces of the ring so that they do not scatter throughout the pump and piping should the ring shatter in the case of a catastrophic overload due to a fault condition such as a malfunction of the pump or other error. This invention satisfies that need.

SUMMARY OF THE INVENTION

The present invention relates to an improved mechanical seal assembly having a hard, but relatively brittle, rotatable seal ring and having a shroud that encloses the seal ring without applying significant radial contact forces to the seal ring and that encloses the pieces of the seal ring within the seal assembly should the seal ring shatter during operation. The seal assembly also includes a stationary seal ring, preferably made of carbon graphite. The stationary and rotatable seal rings have opposed faces and one ring may be urged toward the other ring. The complete seal assembly may be mounted on a shaft sleeve, so that it can be preassembled and then axially positioned on the shaft at the proper operating location.

The stationary carbon graphite seal ring may be sealed, by spaced O-rings, to an encircling metal holder. Also, at least a portion of a face of the ring may be covered by a radially inwardly directed flange on the holder. Because the inside diameter of the stationary seal ring is exposed to the lower pressure fluid and the holder is exposed to the higher pressure fluid, two o-rings between the holder and the stationary seal ring and a radial passage in the stationary seal ring ensure equal pressures on the inside and the outside of this ring, which substantially eliminates severe radial deflections of the carbon graphite seal ring which could be caused by extreme pressure differentials on the inside and outside of the ring. The stationary seal ring may be supported on a "balance" sleeve surrounding and spaced from the shaft sleeve. The balance sleeve permits some angular movement or wobbling of the stationary face to match the rotatable face mounted on the shaft so as to eliminate adverse effects of shaft misalignment which frequently occurs in pumps of the type described.

The rotatable seal ring of the assembly may be resiliently connected to the rotating shaft (or sleeve, as the case may be) by transversely positioned elastomeric keys which fit into pockets formed by transverse external flats formed on the seal ring and transverse grooves cut into the inside of a cylindrical drive ring. The grooves are in an axially extending portion of the drive ring which surrounds the rotatable seal ring. The formation of the flats on the rotatable seal ring avoids notching, and thus weakening, of the seal ring to receive the usual drive pins. The drive ring, by itself, is suitable for preventing a rotatable seal ring made of less brittle material, such as tungsten carbide, from falling apart in case of failure. However, if the ring is made of a relatively more brittle material, such as silicon carbide, the drive ring is not adequate to prevent a shattered ring from breaking apart and possibly scattering inside the pump and reactor system.

The improvement to the above-described mechanical seal assembly includes the use of a hard, but relatively brittle, material such as silicon carbide which provides many benefits and advantages as far as extending the service life of the seal under normal operating conditions. The improvement also comprises the use of a thin-walled annular protrusion that extends from the cylindrical drive ring to the rotatable seal face. Together, the protrusion and the cylindrical drive ring completely enclose the rotatable seal ring. Preferably, the protrusion has a lip at its end disposed adjacent to the rotatable seal face and in contacting relationship with the outside surface of the rotatable seal ring. Additionally, the protrusion may be provided with a plurality of circumferentially spaced slots which weaken the protrusion, reducing the radial contact forces between the lip of the protrusion and the seal ring. These radial forces could cause unwanted deflection of the rotatable ring, adversely affecting the sealing properties of the seal assembly.

By using the above-described improvement, a shattered rotatable seal ring will be enshrouded and the several pieces of the ring will be kept together by the cylindrical drive ring and the protrusion. In addition, the cylindrical drive ring may be secured to the shaft such that during a failure mode, the protrusion will be pushed by the cylindrical drive ring against the stationary seal ring, thereby preventing even very small pieces from escaping out of the seal assembly.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
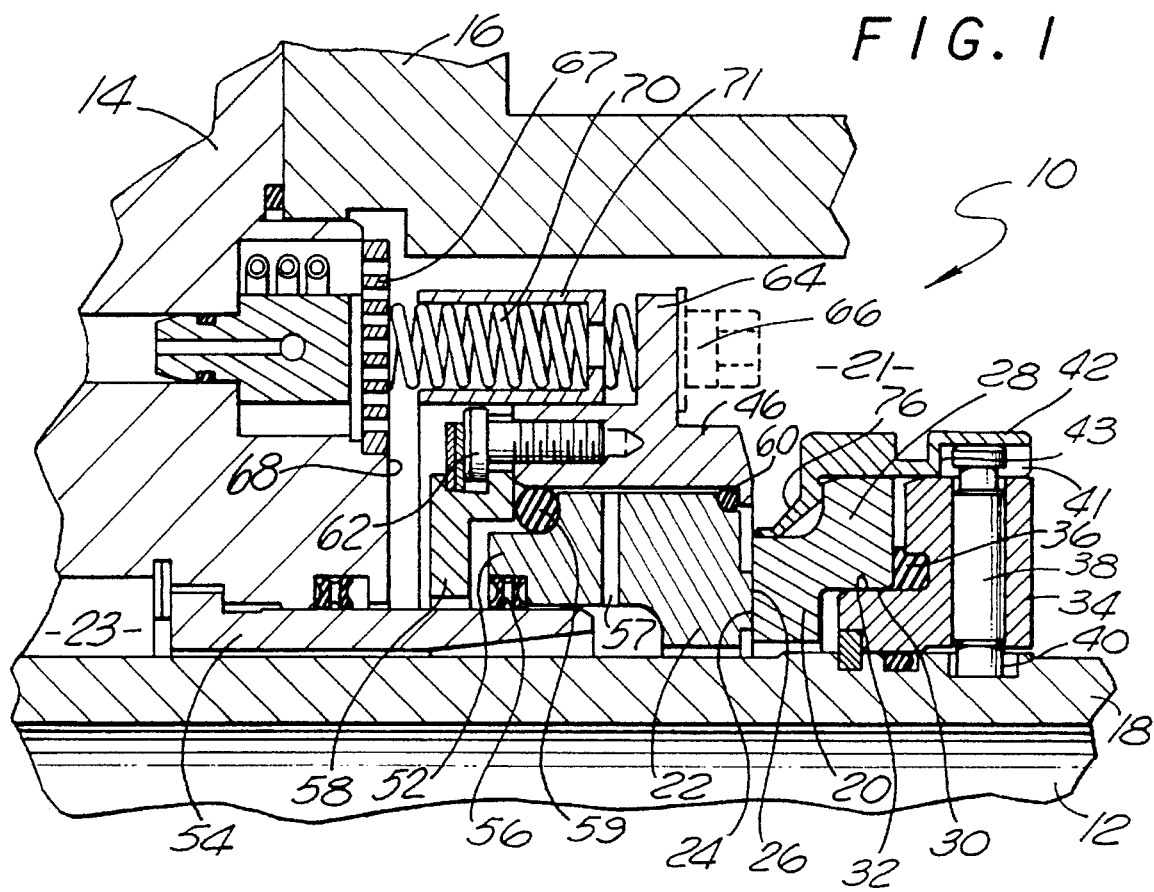
FIG. 1 is a partial cross-sectional view of a mechanical seal assembly constructed according to the present invention.

FIG. 1 illustrates a single stage mechanical seal assembly 10 for use with a rotatable shaft 12 and a seal flange 14 of a seal housing 16. The assembly comprises a shaft sleeve 18, a rotatable seal ring 20, and a stationary seal ring 22, one of the rings being resiliently urged toward the other. The seal housing is located within a pump housing (not shown). Seal rings 20, 22 have relatively rotating opposed and lapped seal faces 24, 26 which substantially prevent the flow of high pressure fluid from a high pressure zone 21 to a lower pressure zone 23. The rotatable seal ring 20 defines an unnotched radially outwardly facing cylindrical surface 72 extending axially from the seal face of the rotatable seal ring and an unnotched radially inwardly facing cylindrical surface 73 extending axially from the seal face of the rotatable seal ring.

The rotatable seal ring 20 is also provided with an annular flange 28, the inner defining surface 30 of which is received on a cylindrical surface 32 of a rotatable face seat 34. The rear of the flange 28 is axially supported by an O-ring 36 encircling the cylindrical surface 32 to provide a resilient axial support for the rotatable seal ring 20 and to provide a seal between the rotatable seal ring 20 and the rotatable face seat 34. Drive pins 38 are received in the rotatable face seat 34 and their ends are received in grooves 40 in the shaft sleeve 18, thus forming a driving connection between the shaft sleeve 18 and the rotatable face seat 34.

Figure 4:
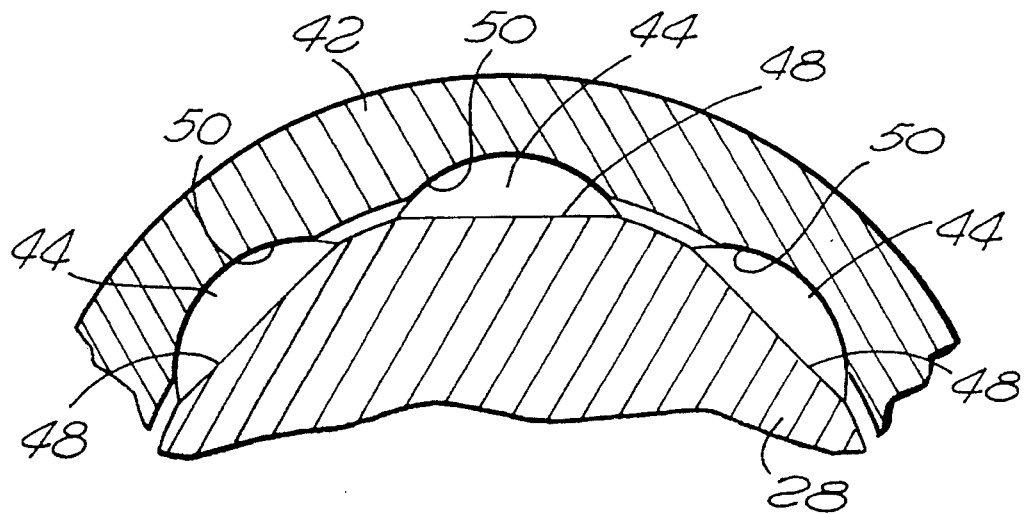
FIG. 4 is a partial cross-sectional view taken along line 4—4 of FIG. 1.

A cylindrical drive ring 42 encircles the rotatable face seat 34 and also the rotatable seal ring flange 28. The drive ring is connected to the flange 28 (see FIGS. 2 and 4 also) by elastomeric keys 44 received in transverse pockets defined by flats 48 on the seal ring flange 28 and grooves 50 in the drive ring 42. The keys 44 provide a resilient driving connection between the drive ring 42 and the rotatable seal ring 20 and cushion the drive therebetween. The resilient connection also radially locates the seal ring 20 in the drive ring 42 during their assembly. The cylindrical drive ring has axially extending grooves 41 for receiving and enclosing the drive pins. Each groove terminates in an end wall 43 on the inner surface of the drive ring. The radially outer corners of the rotatable seal face 24, the flange 28, and the seat 34, may be chamfered to ease the assembly of these pieces within the drive ring 42.

Stationary seal ring 22 has a rearwardly extending tail portion 52 partially encircling a balance sleeve 54. Seal ring 22 is centered on balance sleeve 54 by a four-lobed seal ring 56 positioned between the ring 22 and the sleeve 54. The ring 56 permits axial movement of the stationary seal ring relative to the balance sleeve and prevents undesirable deflections of the stationary seal ring.

The outer circumference of the stationary seal ring 22 is encircled and sealed to a holder 46 by O-rings 59 and 60. A radial passage 57 may be provided in the stationary seal ring so as to permit any seepage of fluid into a zone between the o-rings 59 and 60 to flow to the low pressure side 23 of the seal. This prevents any pressure build-up between the stationary seal ring and the holder which could cause deflection in the ring. An annular flange member 58 is attached to the holder 46 by cap screws 62. The holder 46 substantially eliminates severe radial deflections of the stationary seal ring 22 which could be caused by extreme pressure differentials in the inside and outside of the stationary seal ring 22.

The holder 46 has a radially outwardly extending flange 64 having a plurality of openings to receive lock bolts 66 (only one being shown in phantom) which extend through a thin flat strainer 67 and are threaded into an inwardly directed radial wall 68, preventing rotation of the stationary seal ring 22. Since the openings in the flange 64 are larger than the diameter of the lock bolts 66, the stationary seal ring 22 is free to move axially toward the rotatable seal ring 20. The flange 64 is engaged by a plurality of identical coil springs 70 located in an annular spring retainer 71. The plurality of coil springs 70 also engage the strainer 67. These coil springs urge the stationary seal ring 22, through the spring retainer 71, toward the rotatable seal ring 20. The lock bolts 66 also extend through holes in the spring retainer 71. The lock bolt holes in the spring retainer are large enough to allow the spring retainer to move axially. A more detailed description of the above features of the mechanical seal assembly are provided in U.S. Pat. Nos. 4,586,719 and 5,076,589, previously referred to, which are incorporated by reference herein.

Figure 2:
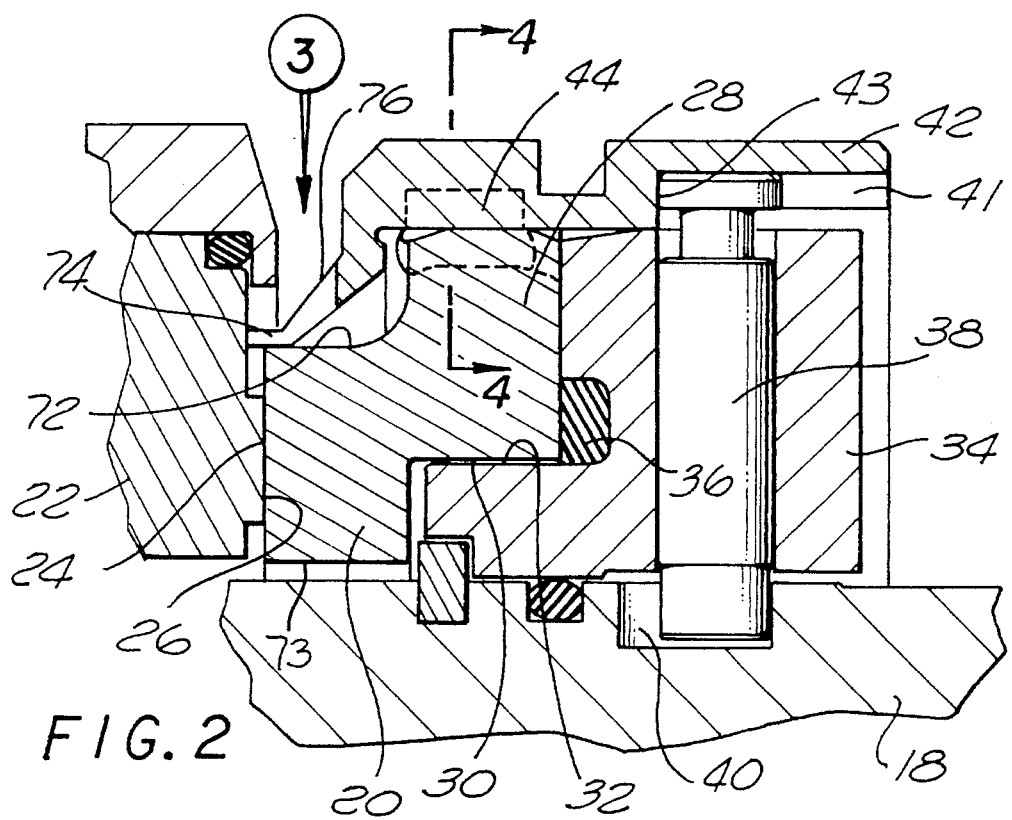
FIG. 2 is an enlarged cross-sectional view of the seal interface of the mechanical seal assembly shown in FIG. 1, with the seal interface shown in an overcompressed condition.

To fully enclose the rotatable seal ring 20, an annular protrusion or shroud 76 is mounted to the cylindrical drive ring 42 (see FIG. 2). In the preferred embodiment, the shroud 76 is integrally formed at one end of the drive ring 42 and extends radially inwardly toward the outer surface 72 of the rotatable seal ring 20. The shroud 76 terminates in a lip 74 which is preferably disposed in contacting relationship with the outer surface 72 of the rotatable seal ring closely adjacent to the rotatable seal face 24.

Figure 3:
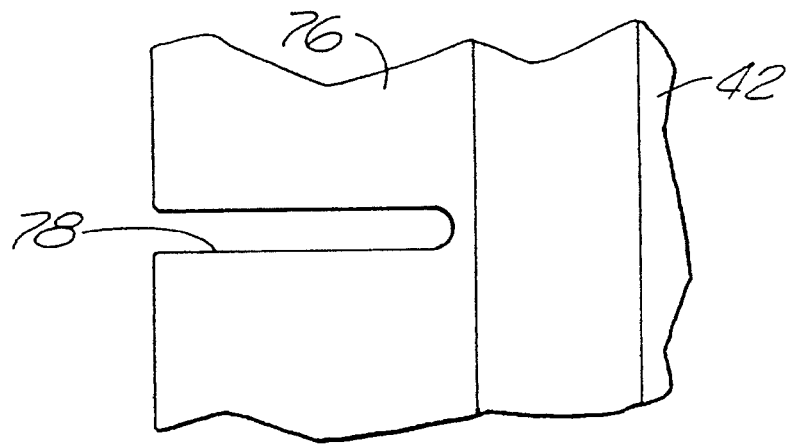
FIG. 3 is a partial plan view of the protrusion shown in FIG. 1.

Preferably, the radial forces between the lip and the ring 20 are sufficient to keep the ring together should it shatter. However, if the radial forces are too great, they could adversely affect the seal face. Thus, to reduce the radial contact forces between the lip and the rotatable seal ring, the shroud may be provided with a plurality of circumferentially-spaced slots 78 (see FIG. 3). The slots tend to minimize the shroud's influence on the pressure and thermal deflections affecting the rotatable seal ring.

The shroud described above, combined with the cylindrical drive ring, will safely contain the pieces of the rotatable seal ring should it shatter during a catastrophic overload. For example, the pump may malfunction or the pump's thrust bearings may fail, causing a sudden axial movement of the shaft. With reference to FIG. 2, a mechanical seal assembly made in accordance with the present invention is shown in a failure mode wherein the shaft is moved to the left relative to the seal housing and the cylindrical drive ring and shroud have also moved to the left due to the drive pin (which is connected to the shaft sleeve) being forced into contact with the end wall 43 of the drive ring. As shown, the shroud moves toward and possibly contacts the stationary seal ring, thereby preventing even very small pieces of the shattered rotatable seal ring from falling out of the assembly. The shattered pieces, which are now contained within the mechanical seal assembly, cause no damage to the pump and are typically removed when the seal assembly is replaced.

Figure 5:
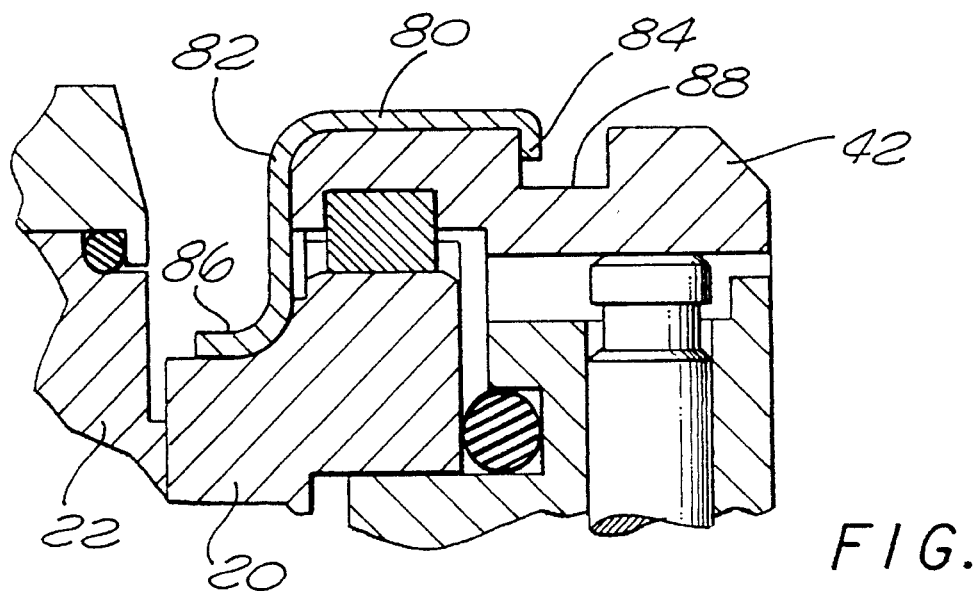
FIG. 5 is a partial cross-sectional view of an alternative embodiment of the invention, showing the protrusion shaped to conform to the surface of the rotatable seal ring and the cylindrical drive ring.

With reference to FIG. 5, an alternative form of shroud is shown. The shroud is a separately formed piece 80 having a lip portion 86 that is in contacting relationship with the rotatable seal ring, an intermediate portion 82 that is shaped to form fit the drive ring and an end portion 84 that is rolled into a notch 88 on the outer surface of the drive ring.

It should be appreciated from the foregoing description that the present invention provides an improved mechanical seal assembly that completely and safely encloses a hard, but relatively brittle, mechanical seal ring in the event that the ring shatters during a catastrophic overload, but which also in normal operation does not influence the seal ring's pressure and thermal deflections.

It will, of course, be understood that modifications to the presently preferred embodiments will be apparent to those skilled in the art. Consequently, the scope of the present invention should not be limited by the particular embodiment discussed above, but should be defined only by the claims set forth below and equivalents thereof.

We claim:

1. A mechanical seal assembly for separating a high pressure fluid and a low pressure fluid, and associated with a rotatable shaft and a stationary housing, said assembly comprising:

a rotatable seal ring having a radially-disposed seal face;

a non-rotatable seal ring connected to the housing, said non-rotatable seal ring having a radially-disposed seal face disposed in facing relationship with the seal face of the rotatable seal ring;

a cylindrical ring connected to the shaft, the cylindrical ring encircling the rotatable seal ring and drivingly connected thereto;

the rotatable seal ring having an exposed portion extending axially out of the cylindrical ring toward the non-rotatable seal ring said exposed portion defining an unnotched radially outwardly facing cylindrical surface extending axially from the seal face of the rotatable seal ring and an unnotched radially inwardly facing cylindrical surface extending axially from the seal face of the rotatable seal ring; and an annular shroud mounted to and extending from the cylindrical ring toward the seal face of the rotatable seal ring, the shroud extending axially substantially the full axial length of the exposed portion of the rotatable seal ring to a location closely adjacent the seal face of the rotatable seal ring to enshroud the rotatable seal ring and keep it together if it shatters;

wherein the annular shroud is disposed relative to the rotatable seal ring so as not to produce any significant radially directed contact forces between the shroud and the rotatable seal ring during normal operation of the mechanical seal assembly.

2. The mechanical seal assembly of claim 1, wherein the shroud terminates in an axially-extending annular lip disposed in contacting relationship with the rotatable seal ring.

3. The mechanical seal assembly of claim 2, wherein the shroud defines a plurality of circumferentially spaced slots configured to reduce the radial contact force between the shroud and the rotatable seal ring.

4. The mechanical seal assembly of claim 1, wherein the shroud, during an overload condition caused by axial movement of the shaft, is axially moveable relative to the rotatable seal ring toward the non-rotatable seal ring.

5. The mechanical seal assembly of claim 1 wherein the shroud, during an overload condition caused by axial movement of the shaft, is axially moveable relative to the rotatable seal ring into contact with the non-rotatable seal ring.

6. The mechanical seal assembly of claim 1, wherein the annular shroud is not in rotating driving contact with the rotatable seal ring.

7. A mechanical seal assembly for separating a high pressure fluid and a low pressure fluid, and associated with a rotatable shaft and a stationary housing, said assembly comprising:

a rotatable seal ring having a radially-disposed seal face;

a non-rotatable seal ring connected to the housing, said non-rotatable seal ring having a radially-disposed seal face disposed in facing relationship with the seal face of the rotatable seal ring;

a cylindrical drive ring connected to the shaft to permit axial movement therewith, said cylindrical drive ring encircling the rotatable seal ring and drivingly connected thereto in such a manner as to permit axial movement of the cylindrical drive ring relative to the rotatable seal ring;

the rotatable seal ring having an exposed portion extending axially out of the cylindrical drive ring toward the non-rotatable seal ring; and an annular shroud fixed to and extending from the cylindrical drive ring toward the seal face of the rotatable seal ring, the shroud extending axially substantially the full axial length of the exposed portion of the rotatable seal ring to a location closely adjacent the seal face of the rotatable seal ring to enshroud the rotatable seal ring and keep it together if it shatters, the shroud located in alignment with the non-rotatable seal ring in the axial direction;

wherein the annular shroud is disposed relative to the rotatable seal ring so as not to produce any significant radially directed contact forces between the shroud and the rotatable seal ring during normal operation of the mechanical seal assembly; and wherein the drive ring and the shroud, during an overload condition caused by axial movement of the shaft, are sufficiently axially moveable relative to the rotatable seal ring to permit the shroud to move into contact with the nonrotatable seal ring.

8. The mechanical seal assembly of claim 7, wherein the shroud terminates in an axially-extending annular lip disposed in contacting relationship with the rotatable seal ring.

9. The mechanical seal assembly of claim 8, wherein the shroud defines a plurality of circumferentially spaced slots configured to reduce the radial contact forces between the shroud and the rotatable seal ring.

10. The mechanical seal assembly of claim 7, wherein the annular shroud is not in rotating driving contact with the rotatable seal ring.

11. A mechanical seal assembly for separating a high pressure fluid and a low pressure fluid, and associated with a rotatable shaft and a stationary housing, said assembly comprising:

a rotatable seal ring having a radially-disposed seal face;

a non-rotatable seal ring connected to the housing, said non-rotatable seal ring having a radially disposed seal face disposed in facing relationship with the seal face of the rotatable seal ring;

a sleeve connected to the shaft, the sleeve having a groove;

a cylindrical drive ring encircling the rotatable seal ring, the drive ring having an axially extending groove and a wall at one end of the groove;

the rotatable seal ring having an exposed portion extending axially out of the cylindrical drive ring toward the non-rotatable seal ring, said exposed portion defining an unnotched radially outwardly facing cylindrical surface extending axially from the seal face of the rotatable seal ring and an unnotched radially inwardly facing cylindrical surface extending axially from the seal face of the rotatable seal ring;

elastomeric means drivingly connecting the drive ring and the rotatable seal ring;

an annular shroud mounted to and extending from the cylindrical drive ring toward the seal face of the rotatable seal ring, the shroud extending axially substantially the full axial length of the exposed portion of the rotatable seal ring to a location closely adjacent the seal face of the rotatable seal ring to enshroud the rotatable seal ring and keep it together if it shatters, the shroud further having an annular lip at a free end thereof in contacting relationship with the rotatable seal ring, wherein the annular shroud is disposed relative to the rotatable seal ring so as not to produce any significant radially directed contact forces between the shroud and the rotatable seal ring during normal operation of the mechanical seal assembly and wherein the annular shroud is not in rotating driving contact with the rotatable seal ring; and a drive pin disposed between the axially extending groove and the sleeve groove for connecting the cylindrical drive ring to the shaft sleeve such that an axial movement of the shaft causing the rotatable seal ring to shatter will cause the drive pin to engage the wall of the drive ring pushing the shroud into contact with the non-rotatable seal ring to prevent shattered pieces of the rotatable seal ring from falling out of the assembly.

12. A mechanical seal assembly for separating a high pressure fluid and a low pressure fluid, and associated with a rotatable shaft and a stationary housing, said assembly comprising:

a rotatable seal ring having a radially-disposed seal face;

a non-rotatable seal ring connected to the housing, said non-rotatable seal ring having a radially-disposed seal face disposed in facing relationship with the seal face of the rotatable seal ring;

a cylindrical ring connected to the shaft, the cylindrical ring encircling the rotatable seal ring and drivingly connected thereto, the rotatable seal ring having an exposed portion extending axially out of the cylindrical ring toward the non-rotatable seal ring; and an annular shroud mounted to and extending from the cylindrical ring toward the seal face of the rotatable seal ring, the shroud extending axially substantially the full axial length of the exposed portion of the rotatable seal ring to a location closely adjacent the seal face of the rotatable seal ring to enshroud the rotatable seal ring and keep it together if it shatters;

wherein the annular shroud is disposed relative to the rotatable seal ring so as not to produce any significant radially directed contact forces between the shroud and the rotatable seal ring during normal operation of the mechanical seal assembly; and wherein the annular shroud is not in rotating driving contact with the rotatable seal ring.

13. The mechanical seal assembly of claim 12, wherein the shroud terminates in an axially-extending annular lip disposed in contacting relationship with the rotatable seal ring.

14. The mechanical seal assembly of claim 13, wherein the shroud defines a plurality of circumferentially spaced slots configured to reduce the radial contact force between the shroud and the rotatable seal ring.

15. The mechanical seal assembly of claim 12, wherein the shroud, during an overload condition caused by axial movement of the shaft, is axially moveable relative to the rotatable seal ring toward the non-rotatable seal ring.

16. The mechanical seal assembly of claim 12, wherein the shroud, during an overload condition caused by axial movement of the shaft, is axially moveable relative to the rotatable seal ring into contact with the non-rotatable seal ring.

* * * * *